United States Patent

O'Neill et al.

[19]

[11] Patent Number: 5,917,664
[45] Date of Patent: *Jun. 29, 1999

[54] BRIGHTNESS ENHANCEMENT FILM WITH SOFT CUTOFF

[75] Inventors: Mark B. O'Neill, New Brighton; Sanford Cobb, Jr., St. Mary's Point, both of Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,792

[22] Filed: Feb. 5, 1996

[51] Int. Cl.⁶ .......................... G02F 1/1335; G02B 5/04; G02B 7/18
[52] U.S. Cl. .......................... 359/831; 359/834; 349/57; 349/62
[58] Field of Search ..................... 359/831, 834, 359/836, 837, 454, 455, 459, 625, 628, 639, 640, 463; 349/57, 62, 67

[56] References Cited

U.S. PATENT DOCUMENTS

| | | |
|---|---|---|
| 2,313,947 | 3/1943 | Klinkum . |
| 4,519,675 | 5/1985 | Bar-Yonah ............................ 359/595 |
| 5,040,883 | 8/1991 | Cobb, Jr. ............................... 359/831 |
| 5,467,417 | 11/1995 | Nakamura et al. ..................... 385/36 |

FOREIGN PATENT DOCUMENTS

| | | |
|---|---|---|
| 04 490132 A2 | 11/1991 | European Pat. Off. . |
| 0 573 268 A2 | 6/1993 | European Pat. Off. . |
| 0006630 | 1/1986 | Japan ..................................... 359/455 |
| WO 94/21094 | 9/1994 | WIPO . |

*Primary Examiner*—Cassandra Spyrou
*Assistant Examiner*—Mark A. Robinson
*Attorney, Agent, or Firm*—Stephen W. Buckingham

[57] ABSTRACT

A brightness enhancement film has a plurality of linear prisms. The prisms are disposed in pairs, each pair having first and second prisms and each prism has a prism angle and a valley angle. Either the prism angles or the valley angles, but not both, are equal.

11 Claims, 13 Drawing Sheets

BRIGHTNESS ENHANCEMENT FILM WITH SOFT CUTOFF

BACKGROUND OF THE INVENTION

It is well-known that structured surface materials can increase the apparent on axis brightness of Lambertian backlights such as the ones commonly used with liquid crystal displays (LCD's). These films are commonly known as brightness enhancement films. Such films function by refracting light that would be emitted at large angles relative to the display axis into smaller angles. Light that would, absent the brightness enhancement film, be emitted at a small angle relative to the display axis is reflected back into the backlight for recycling. There it strikes a diffuse reflector, randomizing its direction. After being reflected it will reenter the brightness enhancement film and be refracted or reflected as before.

The effect of brightness enhancement film is to increase the amount of light emitted at small angles to the axis of the display by reducing the amount emitted at greater angles. Thus, as one looks at a display at increasing angles with respect to the axis, the perceived brightness will decline. A typical film will provide a slowly declining brightness from a direction parallel to the axis to an angle of about 35 degrees to the axis. Between 35 and 40 degrees the perceived brightness will decline very rapidly. This effect is known as a sharp cutoff. Some users would prefer a more gradual or soft cutoff.

SUMMARY OF THE INVENTION

According to the present invention a brightness enhancement film has a plurality of linear prisms. The prisms are disposed in pairs, each pair having first and second prisms and each prism has a prism angle and a valley angle. Either the prism angles or the valley angles, but not both, are equal.

DETAILED DESCRIPTION

The following discussion will describe brightness enhancement film that increase the apparent brightness of a backlight for use with an information display when that display is viewed in a direction parallel to the display axis. For these purposes the display axis runs normal to the plane of the display. Further, where two brightness enhancement films are in the same display, the film farther from the light source is identified as the top one regardless of actual orientation at any given time.

Generally, brightness enhancement films of the prior art have included a structured surface having parallel linear prisms thereon. The other surface is normally smooth. The prisms are typically isosceles triangles with adjacent sides forming a 90 degree angle both at the peaks and the grooves, although other angles may be used.

Figure 1:
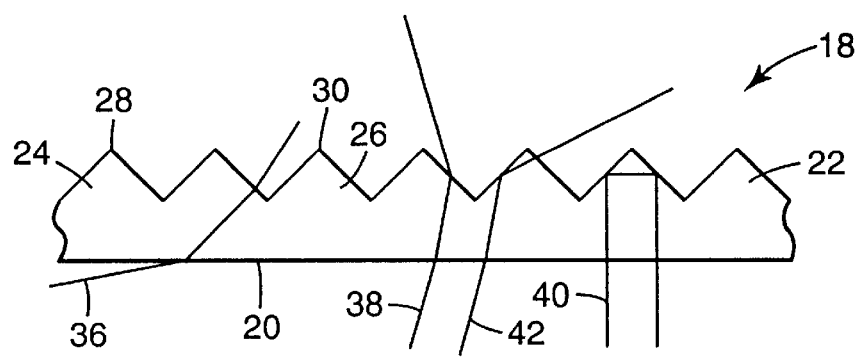
FIG. 1 is a brightness enhancement film of the prior art.

FIG. 1 shows a typical brightness enhancement film of the prior art. The brightness enhancement film of FIG. 1, designated generally as 18, has a smooth surface 20 and a structured surface 22. Structured surface 22 has a plurality of prisms such as prisms 24 and 26. Each prism has a peak such as peaks 28 and 30 of prisms 24 and 26, respectively. Generally the peaks are chosen to have 90 degree included angles since this provides the greatest increase in brightness along the axis of the display.

FIG. 1 illustrates how the prior art brightness enhancement film improved the apparent brightness along the axis of a display. The brightness enhancement film of FIG. 1 is assumed to be of polycarbonate and to have an index of refraction of 1.586. In FIG. 1, four exemplary light rays are shown. The first, light ray 36, approaches smooth surface 20 at a grazing angle, i.e., an angle to the normal approaching 90 degrees. If light ray 36 makes an angle of 89.9 degrees to the normal to surface 20 when it strikes structured surface material 18, it will be refracted such that it makes an angle of 39.1 degrees to the normal as it travels through structured surface material 18. Upon reaching structured surface 22, it will be refracted again. Because of the structures on structured surface 22, it will be refracted so that again it will make a smaller angle to the normal to structured surface 20. In the example it will make an angle of 35.6 degrees.

Light ray 38 approaches smooth surface 20 at an angle much closer to the normal. It also is refracted as it passes through smooth surface 20, but to a lesser extent. If light ray 38 approaches smooth surface 20 at an angle of 10 degrees to the normal to smooth surface 20, it will emerge from structured surface 22 at an angle of 37.7 degrees to the normal to smooth surface 20 but on the opposite side of that normal.

Light ray 40 approaches at an angle such that it is totally internally reflected twice by structured surface 22.

Finally, light ray 42 approaches smooth surface 20 at an angle similar to that of light ray 38, but on an opposing angled facet and is totally internally reflected by one side of a prism on structured surface 22, but not by the second side. As a result it emerges at a large angle to the normal to smooth surface 20. Because such a reflection only occurs to a light ray that is traveling in a direction that forms a high incidence angle to the side it strikes, the prisms provide a very small cross section to such rays. In addition many of those rays will reenter the next prism and be returned.

Figure 2:
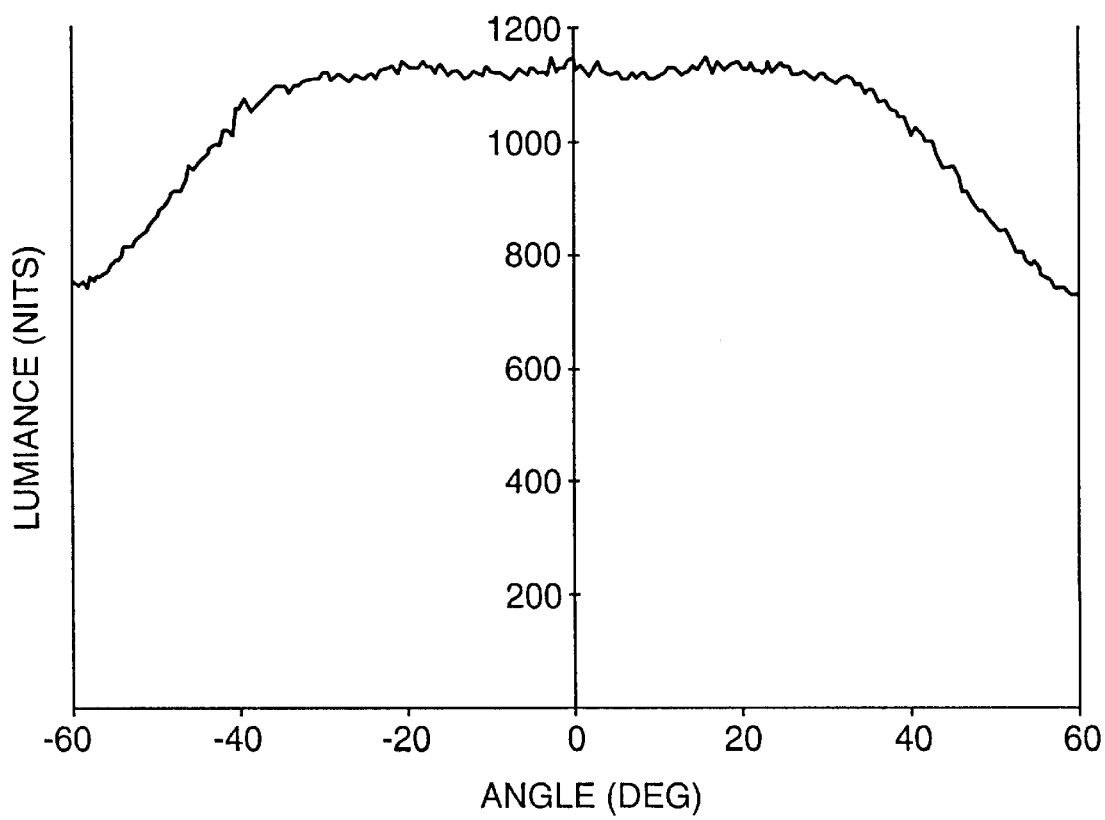
FIGS. 2 and 3 are luminance plots of a backlight without brightness enhancement film.

FIG. 2 is a plot of a horizontal luminance scan of a typical backlight used with LCD's without any brightness enhancement film. In FIG. 2 the luminance in nits (candela per m$^2$) is plotted against viewing angle relative to the backlight axis. A horizontal scan means that the measuring apparatus was rotated in the horizontal plane. As may be seen from FIG. 2, the luminance is fairly constant from an on axis viewing angle out to about 35 degrees. At about 35 degrees the luminance begins to drop.

Figure 3:
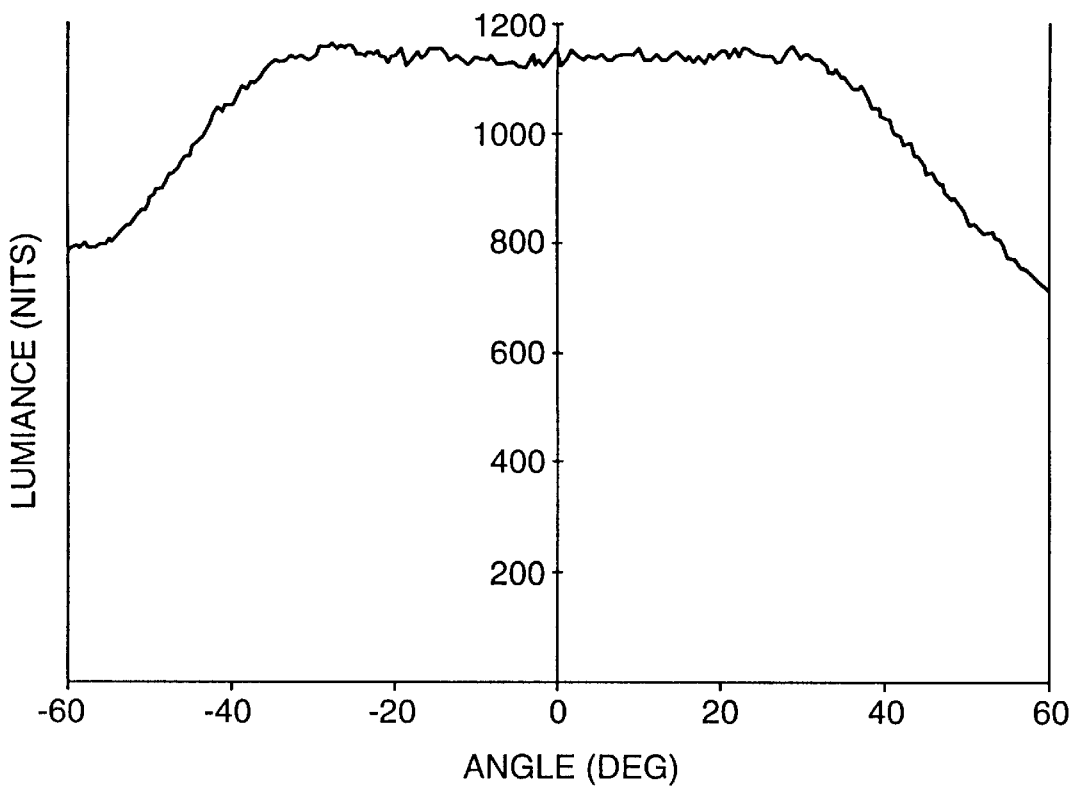

FIG. 3 is a vertical luminance scan of the same backlight of FIG. 2. As may be seen, the luminance characteristics as a function of vertical angle are very similar to those as a function of horizontal angle shown in FIG. 2.

Figure 4:
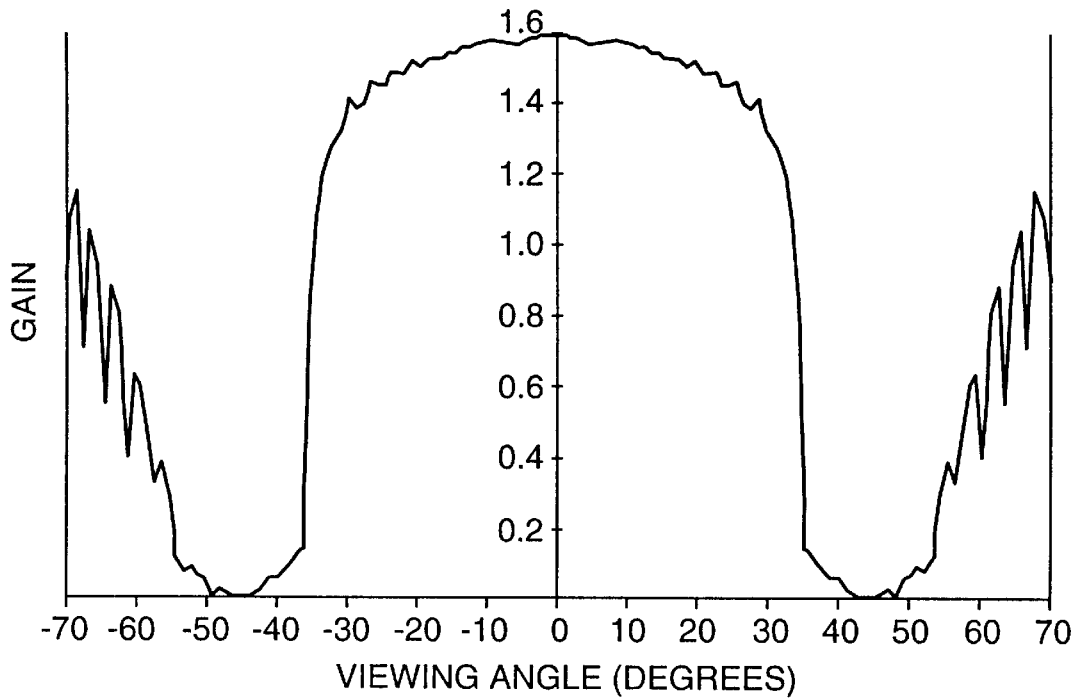
FIG. 4 is a computer generated prediction of the optical gain of a prior art brightness enhancement film.

FIG. 4 is a plot of the optical gain expected in a backlight utilizing a single sheet of the prior art brightness enhancement film as a function of viewing angle in a plane perpendicular to the prisms. The calculations to produce the curve of FIG. 4 assumed 75 percent cavity efficiency and brightness enhancement film having an index of refraction of 1.586. Optical gain is defined as the ratio of the luminance at a particular viewing angle to the luminance of the backlight on the backlight's axis without the brightness enhancement film. As may be seen, the gain reaches a peak of about 1.6 on the axis of the backlight and drops slowly until an angle of about 35 degrees from the backlight's axis where it drops very rapidly.

Figure 5:
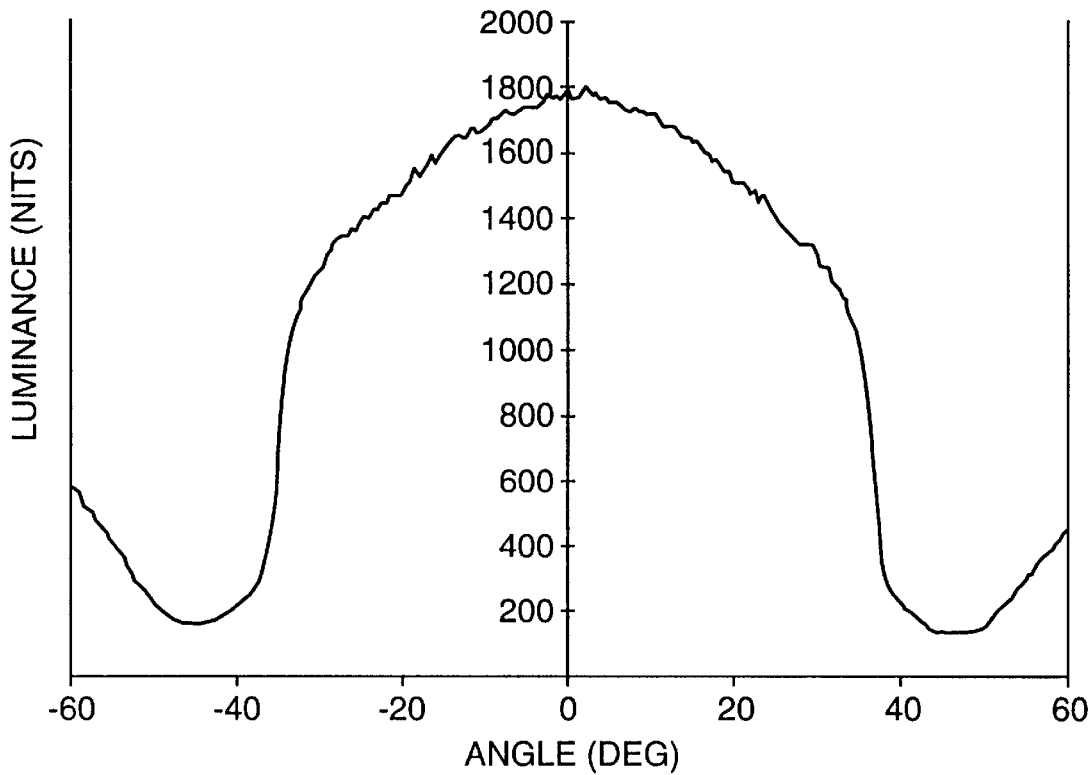
FIGS. 5 and 6 are luminosity plots of a backlight having a single sheet of prior art brightness enhancement film thereon.
Figure 6:
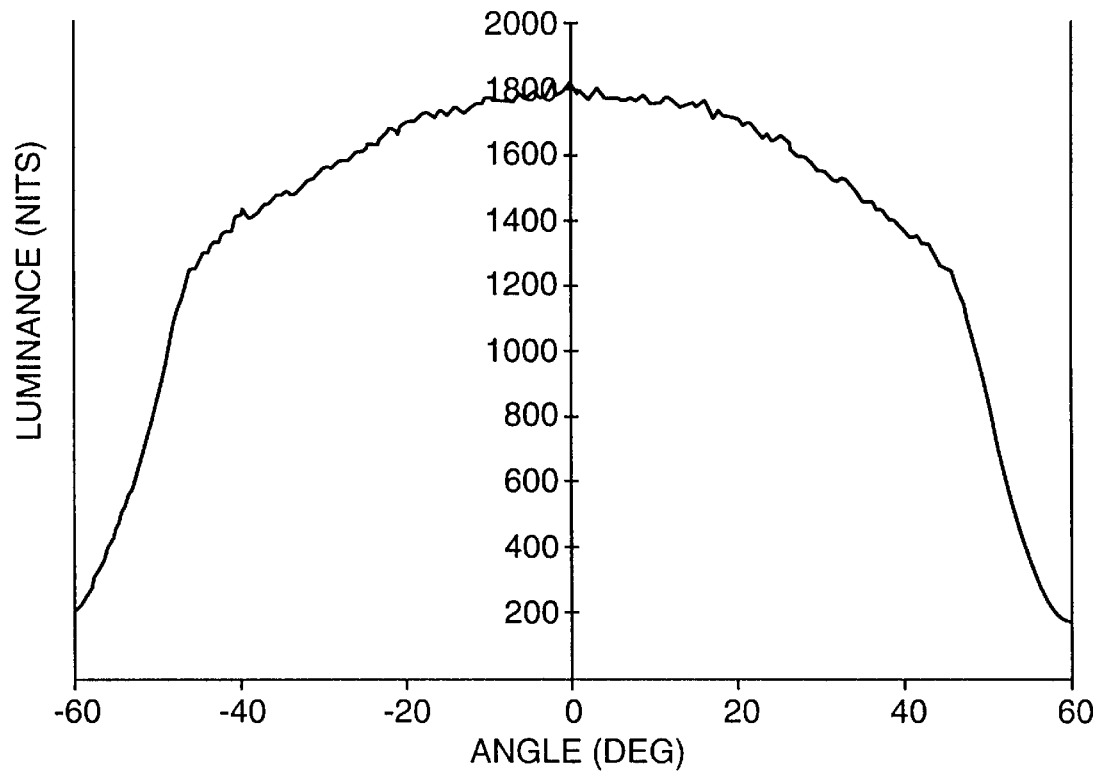

FIG. 5 is a plot of the actual measured luminance values of an existing prior art brightness enhancement film having 90 degree prisms and 50 micrometer peak-to-peak pitch rotated in a plane perpendicular to the prism direction. As may be seen, this conforms well to the theoretical plot of FIG. 4. For comparison purposes FIG. 6 plots the measured luminance values as a function of viewing angle along the prisms rather than perpendicular to the prisms.

Figure 7:
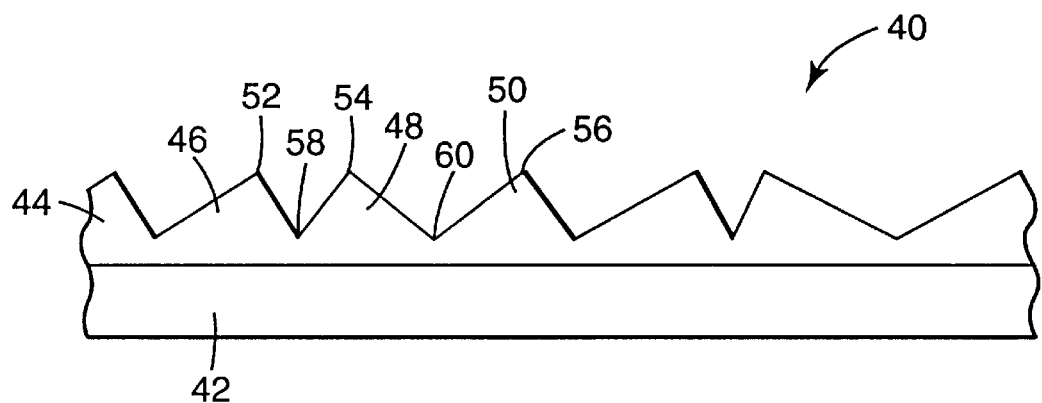
FIG. 7 shows a first embodiment of a brightness enhancement film according to the present invention.

FIG. 7 shows a film according to the invention for providing a soft cutoff. FIG. 7 shows a brightness enhancement film, designated generally as 40, according to the invention. Brightness enhancement film 40 includes a substrate 42 and a structured surface material 44. Substrate 42 is generally a polyester material and structured surface material 44 is typically an ultraviolet-cured acrylic. Alternatively, brightness enhancement film 40 could be extruded to form a unitary construction with no separate substrate and structured surface overlay. The exterior surface of substrate 42 is preferably flat, but could have structures as well. Furthermore, other alternative substrates could be used.

Structured surface material 44 has a plurality of prisms such as prisms 46, 48, and 50, formed thereon. Prisms 46, 48, and 50 have peaks 52, 54, and 56, respectively. All of peaks 52, 54, and 56 have peak or prism angles of preferably 90 degrees, although included angles in the range 60 degrees to 120 degrees would work effectively in the present invention. Between prisms 46 and 48 is a valley 58. Between prisms 48 and 50 is a valley 60. Valley 58 may be considered to have the valley associated with prism 46 and has a valley angle of 70 degrees and valley 60 may be considered the valley associated with prism 48 and has a valley angle of 110 degrees, although other values could be used. Effectively, brightness enhancement film 40 increases the apparent on axis brightness of a backlight by reflecting and recycling some of the light and refracting the remainder like prior art brightness enhancement film, but with the prisms canted in alternating directions. The effect of canting the prisms is to increase the size of the output light cone.

Figure 8:
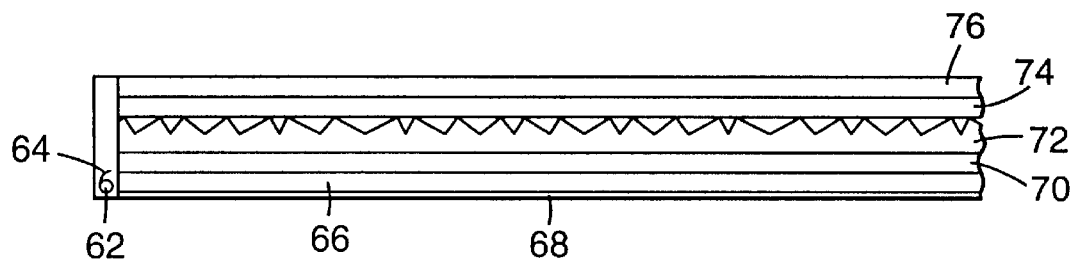
FIG. 8 shows a backlit display including brightness enhancement film according to the present invention.

FIG. 8 shows a display according to the invention. The display of FIG. 8 includes a light source 62, typically a small fluorescent tube. Behind light source 62 is a reflector 64 to direct light in the desired direction. Reflector 64 directs light from light source 62 into light pipe 66. Typically light pipe 66 is a solid piece of optically-transparent acrylic material. Behind light pipe 66 is a reflective material 68. Typically, on the back of light pipe 66 are light extraction dots, not shown. In front of light pipe 66 is a diffuser 70. Light from light pipe 66 is extracted through its front surface and directed through diffuser 70.

In front of diffuser 70 is brightness enhancement film 72. Light passes through diffuser 70 and enters brightness enhancement film 72. Brightness enhancement film 72 will reflect or refract light as described. Light that is reflected will return through diffuser 70, light pipe 66, and be reflected by reflective material 68. This light is then recycled. Diffuser 70 randomizes the direction of the light so that it will not be repeatedly reflected by brightness enhancement film 72. Alternatively, diffuser 70 could be omitted and reflective material 68 could be a diffuse reflector.

Light that is refracted by brightness enhancement film 72 passes on into an optional second sheet of brightness enhancement film 74. Brightness enhancement film 74 could be a material identical to brightness enhancement film 72, but with the prisms running in a different direction, typically perpendicular to those of brightness enhancement film 72. Alternatively, brightness enhancement film 74 could be a brightness enhancement film of the prior art or another embodiment of the brightness enhancement film of the present invention. The benefit of the present invention will be achieved even if brightness enhancement film 74 is omitted from the display, although, including two brightness enhancement films normally achieves higher gain.

Figure 9:
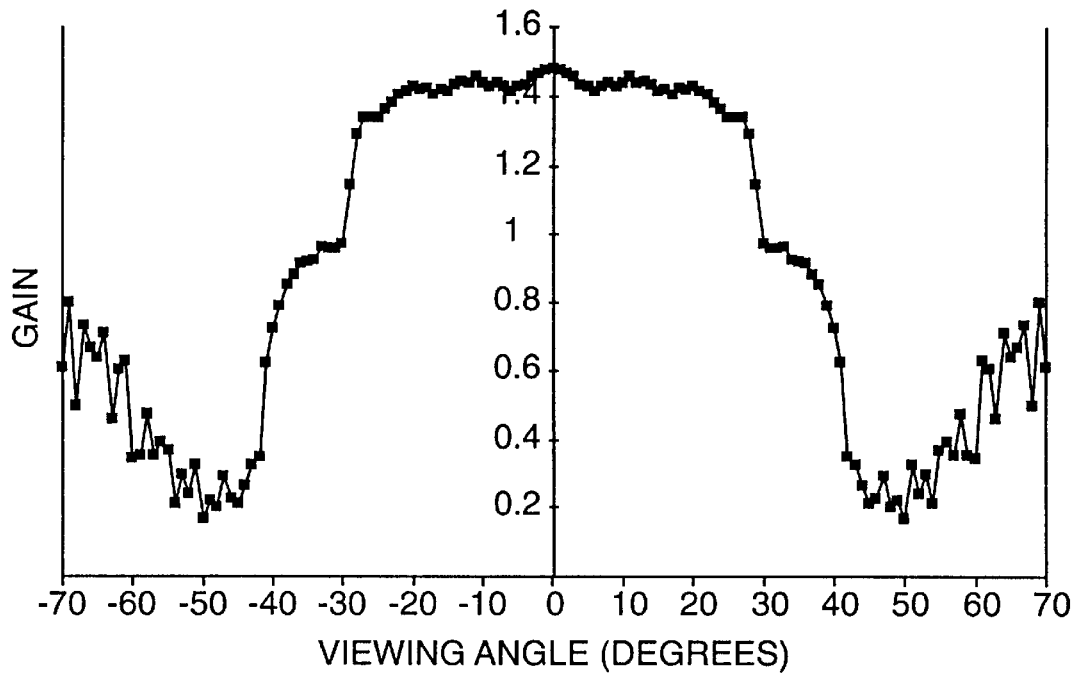
FIG. 9 shows a computer produced predicted gain curve for a single sheet of the brightness enhancement film shown in FIG. 7.

After light emerges from brightness enhancement film 74, it passes through LCD 76. FIG. 9 shows a computer calculation of the expected optical gain of a brightness enhancement film of the type shown in FIG. 7 used with a typical backlight. As may be seen, the expected on axis optical gain is slightly less than that shown in FIG. 4 for a prior art brightness enhancement film. Instead, however, the gain declines more gradually with increasing angles providing the desired soft cutoff.

Figure 10:
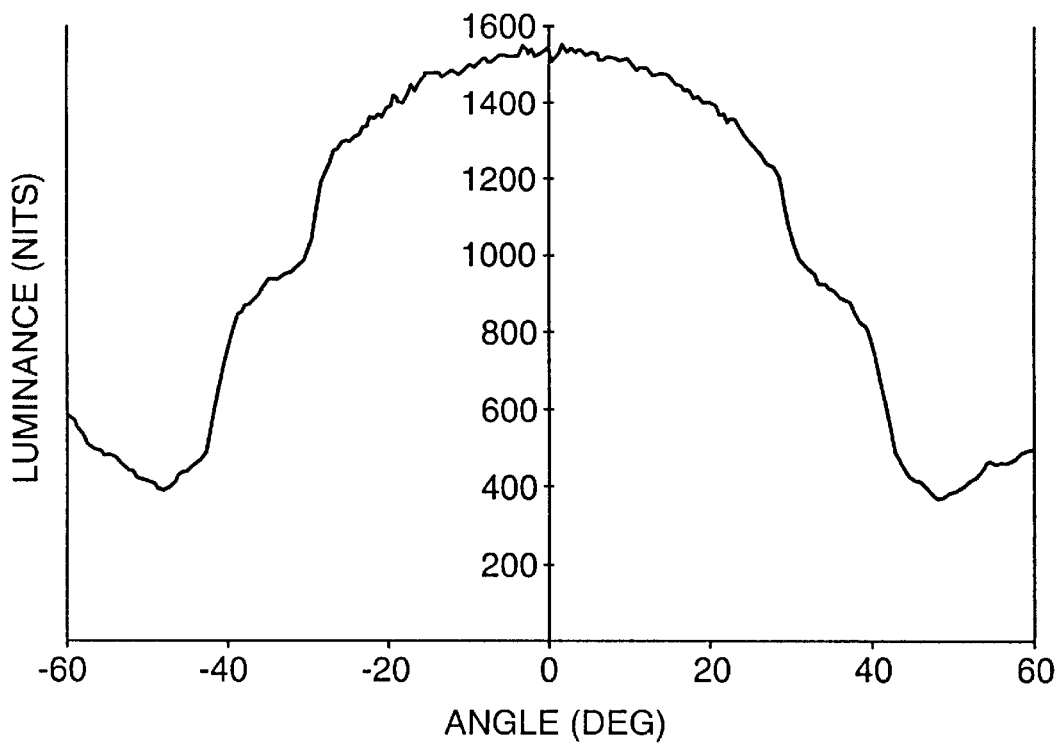
FIGS. 10 and 11 are the luminosity plots for a backlight utilizing one sheet of the brightness enhancement film of FIG. 7.

FIG. 10 shows an actual measurement of the luminance of a backlight utilizing a brightness enhancement film of the type shown in FIG. 7 as a function of viewing angle. The measurements shown in FIG. 10 were taken perpendicular to the direction of the prisms. As may be seen, the shape of the curve in FIG. 10 conforms very well to the predicted shape of FIG. 9.

Figure 11:
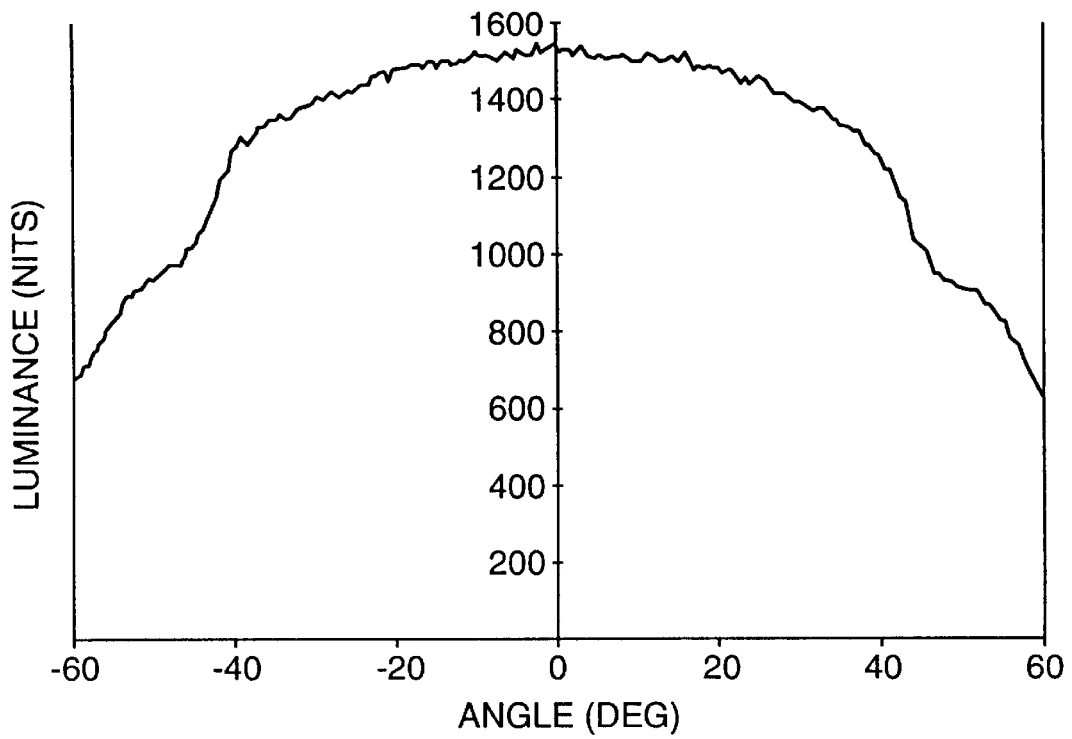

FIG. 11 shows the measured luminance values of a backlight having a single sheet of the brightness enhancement film of the type shown in FIG. 7 as a function of viewing angle parallel to the prisms. As may be seen, the general shape of the curve of FIG. 11 is similar to that of the backlight without a brightness enhancement film as shown in FIG. 2. The luminance values are, however, elevated due to the brightness enhancement effect.

Figure 12:
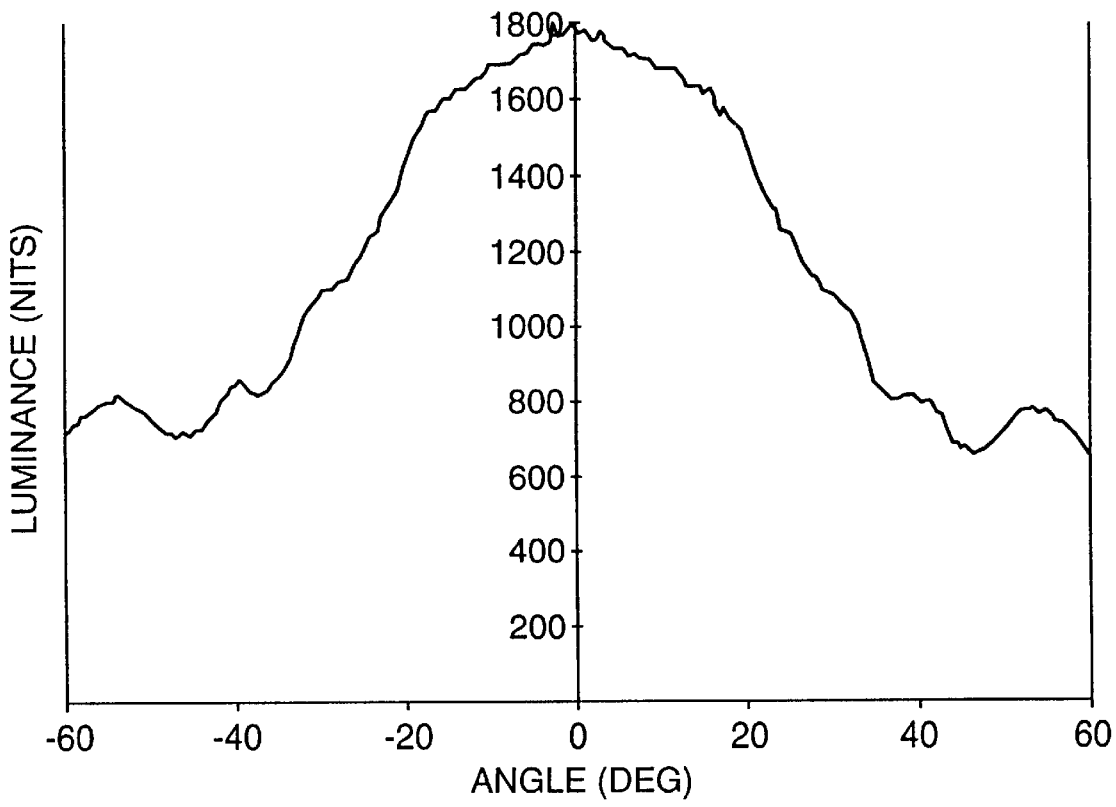
FIGS. 12 and 13 are luminosity plots of a backlight using two sheets of the brightness enhancement film of FIG. 7.
Figure 13:
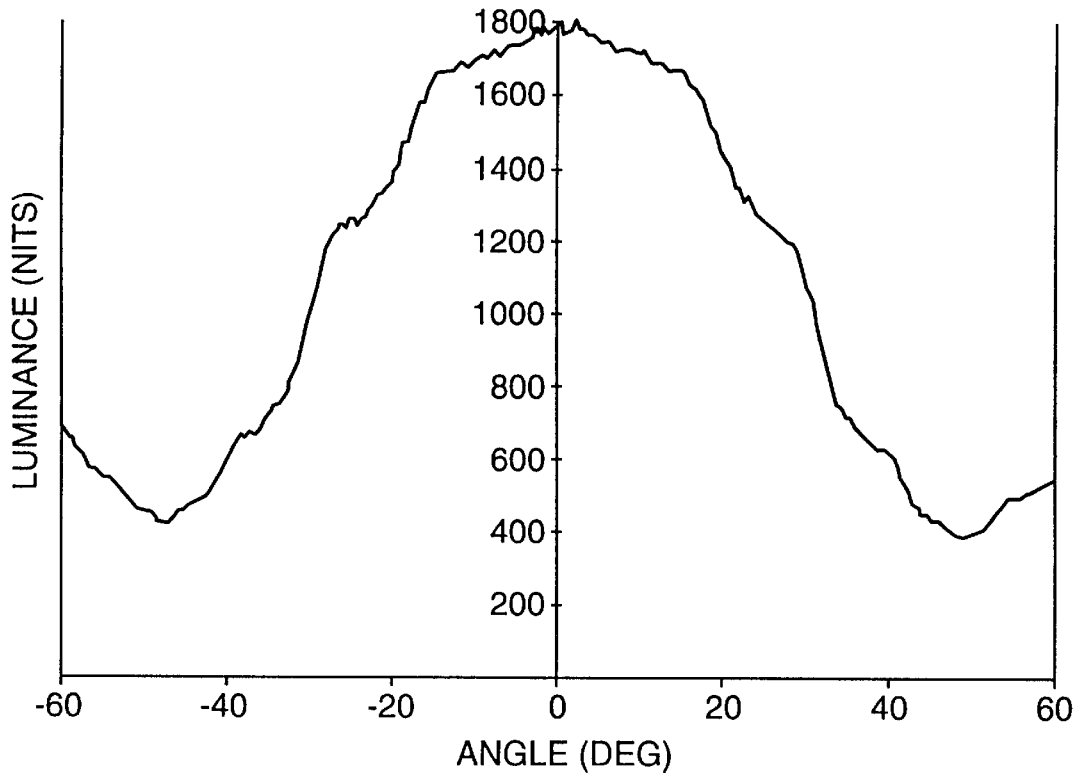
Figure 14:
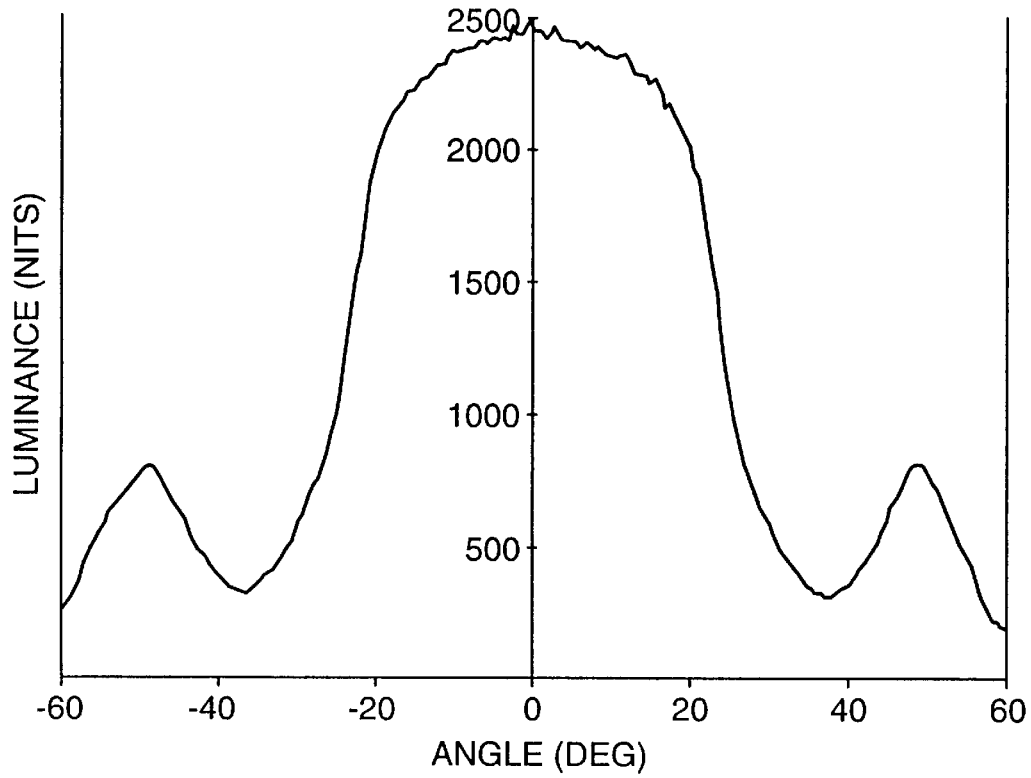
FIGS. 14 and 15 are luminosity plots of a backlight having two sheets of prior art brightness enhancement film.
Figure 15:
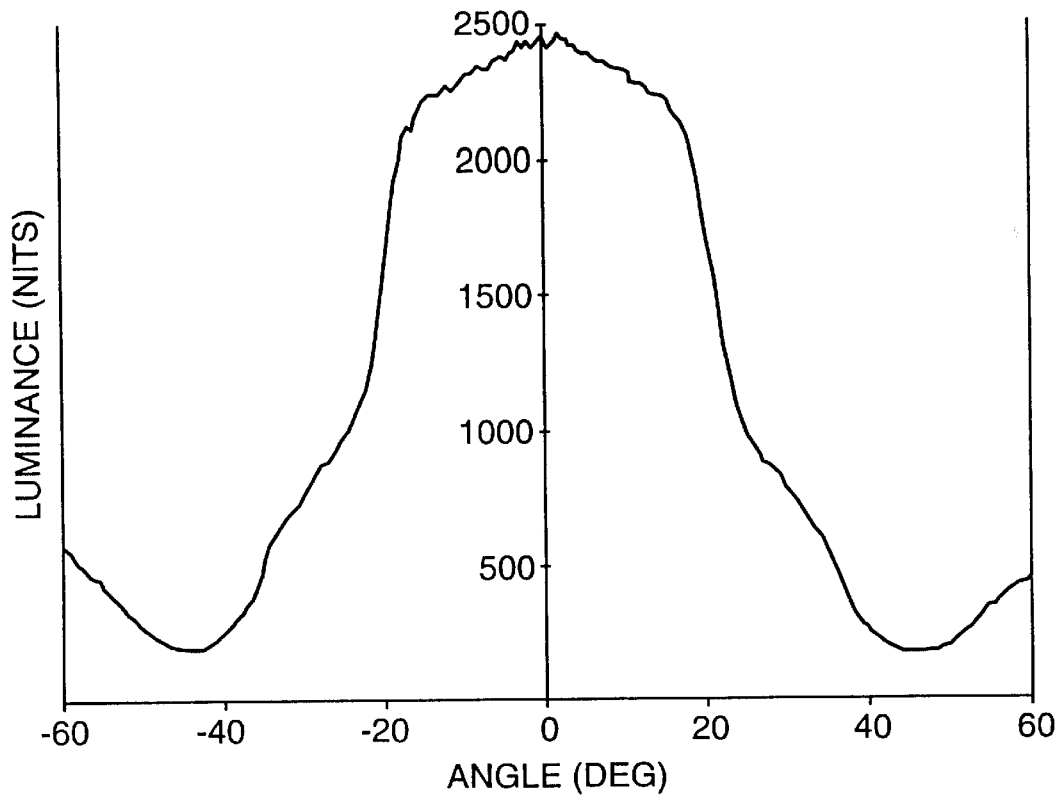

FIG. 12 shows the luminance of a backlight according to FIG. 8 having two sheets of brightness enhancement film of the type shown in FIG. 7 as a function of angle parallel to the prism direction of brightness enhancement film 74 of FIG. 8. FIG. 13 is a plot of the measured luminance of the backlight of FIG. 8 in a direction perpendicular to the prism direction of brightness enhancement film 74 of FIG. 8. For comparison purposes FIGS. 14 and 15 are luminance plot for a backlight using prior art brightness enhancement film corresponding to FIGS. 12 and 13, respectively. As may be seen, the luminance values in the plots of FIGS. 12 and 13 fall off much more gradually with increasing angles, thus providing the desired soft cutoff.

Figure 16:
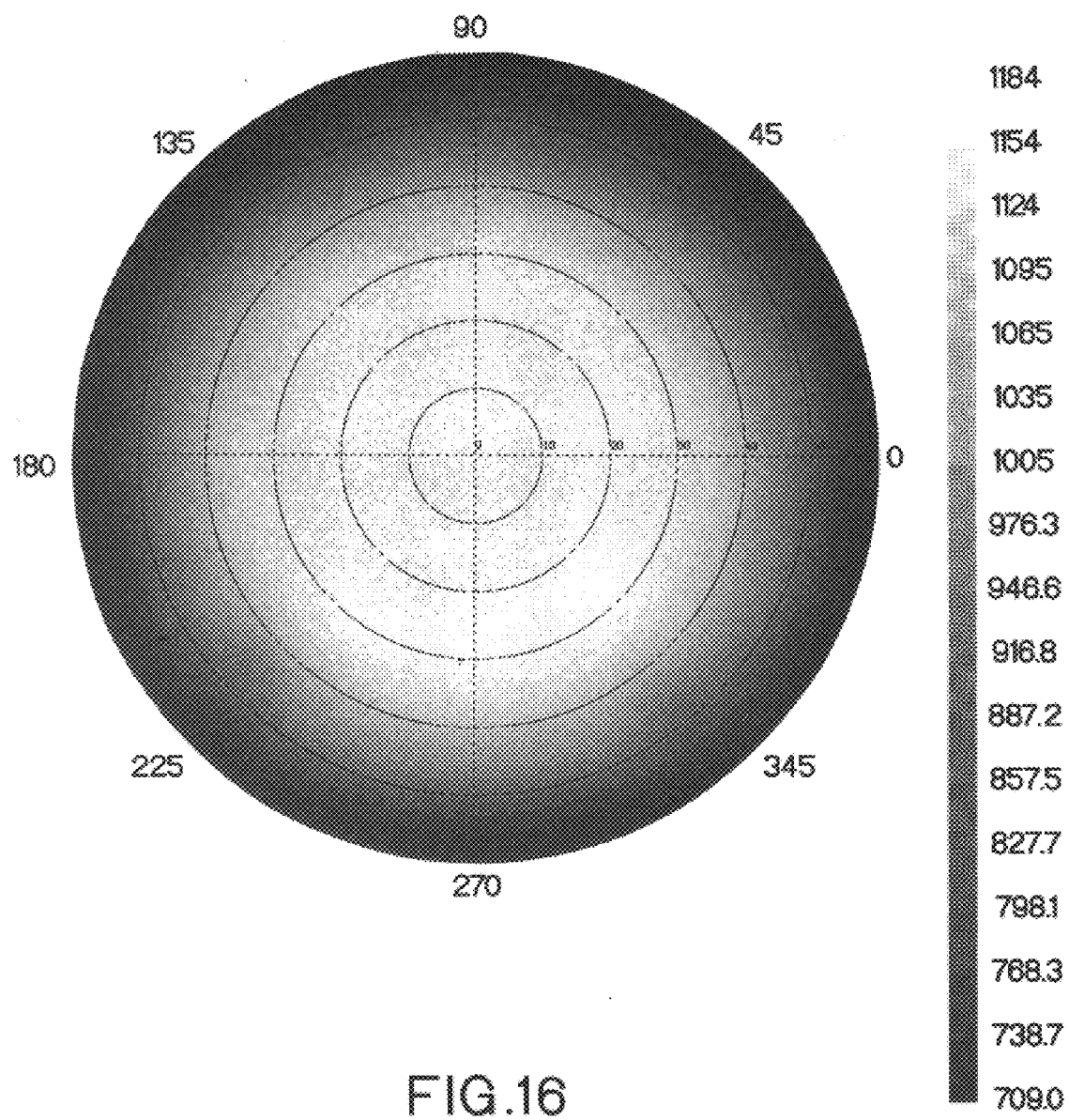
FIG. 16 is an iso-luminosity plot for a backlight with no brightness enhancement film.
Figure 17:
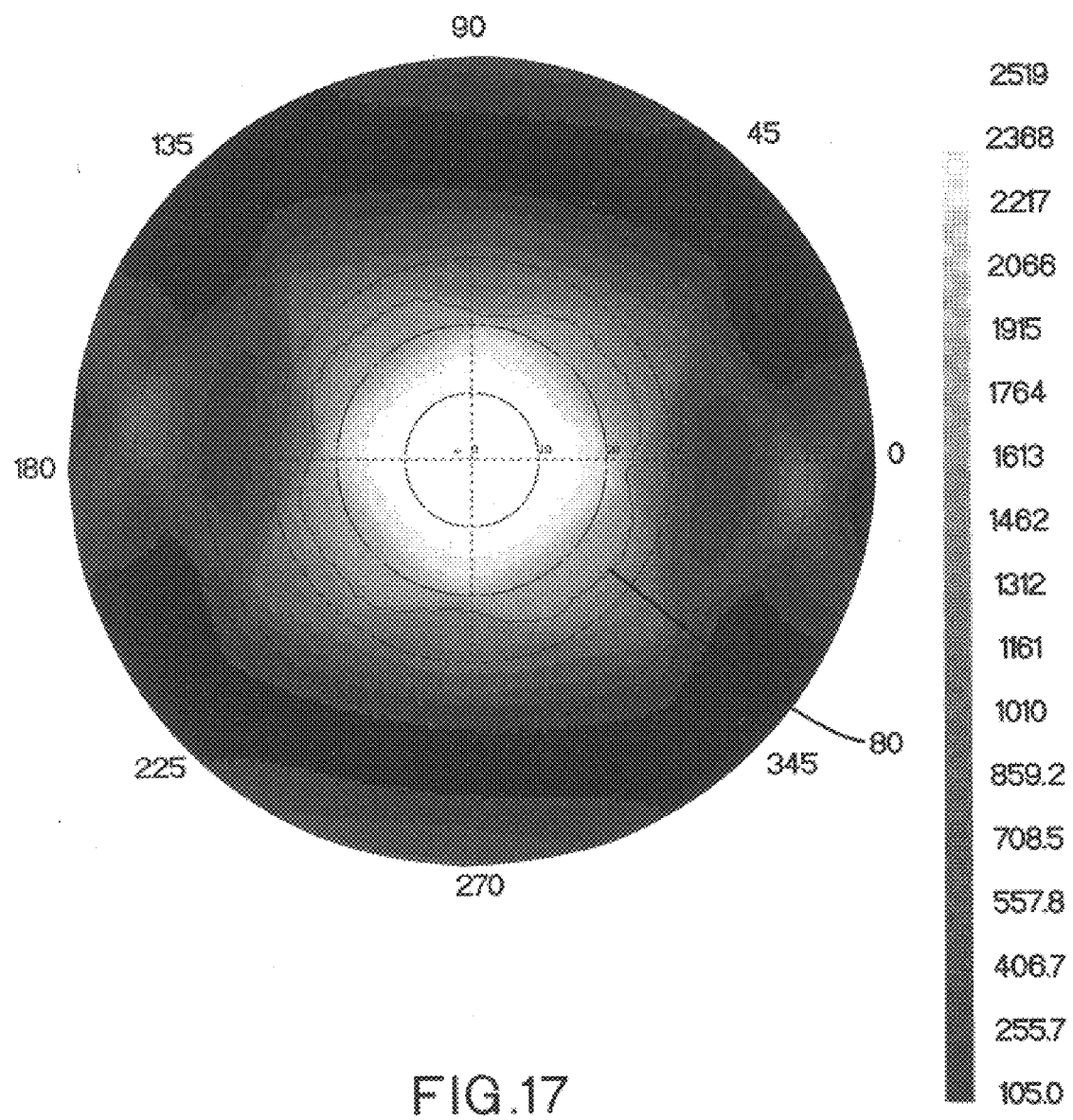
FIG. 17 is an iso-luminosity plot for a backlight having two sheets of prior art brightness enhancement film.
Figure 18:
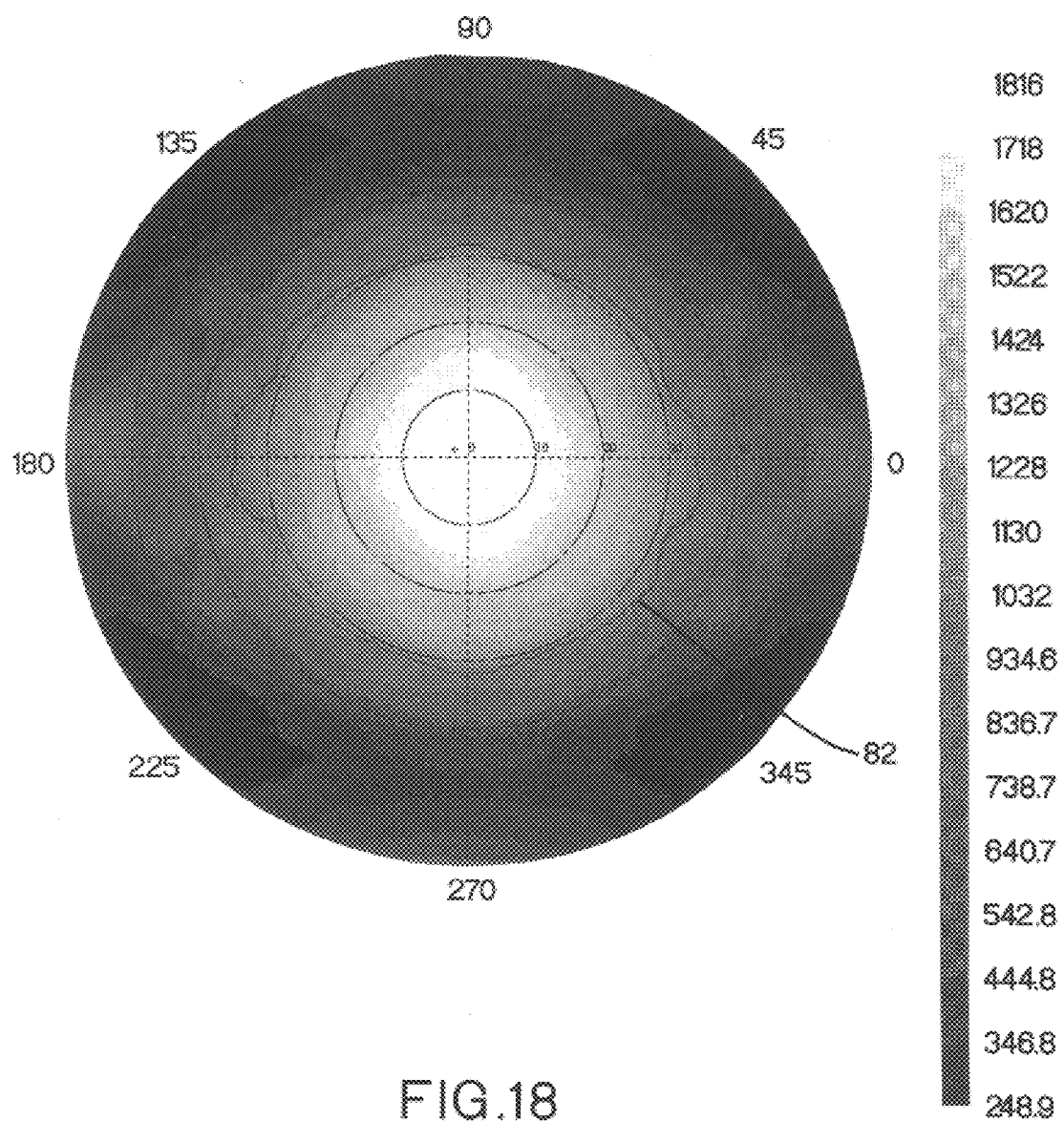
FIG. 18 is an iso-luminosity plot for a backlight having two sheets of the brightness enhancement film of FIG. 7.

FIGS. 16, 17, and 18 show iso-luminance scans for a backlight with no brightness enhancement film, a backlight with crossed sheets of prior art brightness enhancement film, and crossed sheets of brightness enhancement film of the type shown in FIG. 7, respectively. These scans represent the luminance of the backlights over a range of 0 to 60 degrees from the axis of the display around an azimuthal angle of 360 degrees over the front of the light. The dashed circles represent angles of 10 degrees, 20 degrees, 30 degrees, 40 degrees, and 50 degrees with respect to the backlight axis. The lighter regions of these graphs indicate a greater luminance while the darker regions indicate angles at which the luminance is lower. It should be noted that the scales are adjusted according to the overall on axis luminance of the various displays. Therefore these show the luminance as a function of angle for each backlight, but cannot be directly compared with one another to indicate the overall luminance of each one.

As may be seen from FIG. 16, the luminance of the backlight without any brightness enhancement is relatively constant until it begins to drop off at angles between 40 and 50 degrees with respect to the axis. In contrast, the luminance of the backlight with the prior art brightness enhancement film, shown in FIG. 17, drops off relatively rapidly reaching half of its luminance value at angles of around 25 degrees, represented by dashed line 80. At angles greater than 25 degrees the luminance drops off quite rapidly.

In contrast to the plot of FIG. 17, FIG. 18 shows a more gradual decline in luminance with increased angles. The half maximum luminance value is reached at slightly greater than 30 degrees, as indicated by line 82. After that the luminance still declines more gradually than in FIG. 17.

Figure 19:
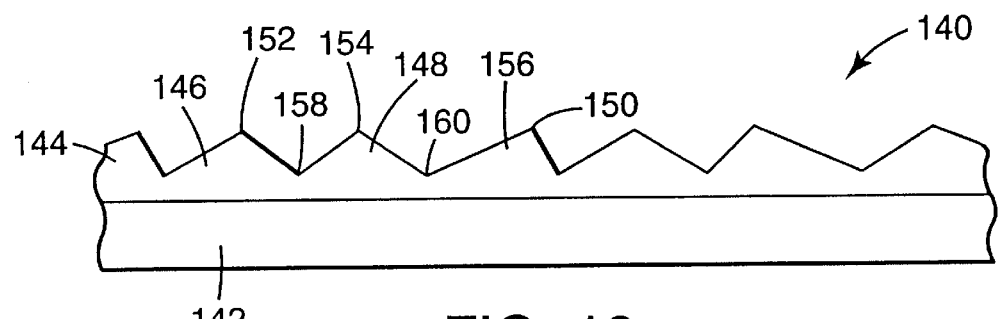
FIG. 19 shows an alternative embodiment of the brightness enhancement film of the present invention.

As an alternative to the soft cutoff brightness enhancement film of FIG. 7, a similar effect may be achieved by utilizing symmetric prisms, but providing alternating peak angles for the prisms. Preferably the prisms alternate between greater than 90 degrees and less than 90 degrees. FIG. 19 illustrates such a film. Brightness enhancement film 140 includes a substrate 142 and a structured surface overlay 144. As in the film of FIG. 8, substrate 142 is generally a polyester and film 144 an ultraviolet-cured acrylic. Also like the brightness enhancement film of FIG. 7, the film of FIG. 19 could alternatively be produced in a unitary structure by such processes as extrusion.

Structured surface overlay 144 includes prisms such as prisms 146, 148, and 150. Prisms 146, 148, and 150 have peaks 152, 154, and 156, respectively. Peaks 152 and 156 have peak or prism angles of 110 degrees. Peak 154 has a peak or prism angle of 70 degrees. Between peak 152 and 154 is a valley 158 that may be associated with peak 152. Between peaks 154 and 156 is a valley 160 that may be associated with peak 154. Both of valleys 158 and 160 have 90 degree valley angles.

Figure 20:
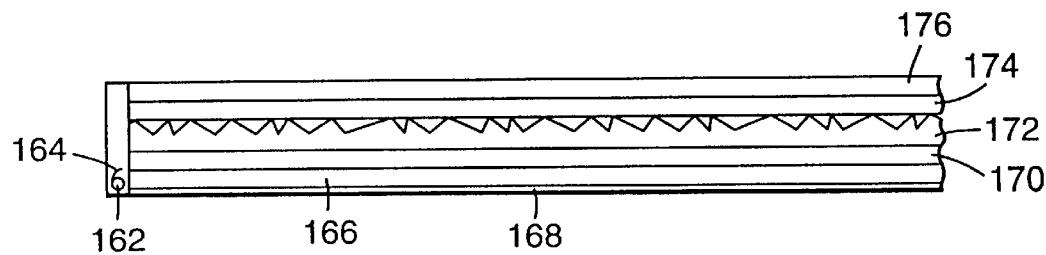
FIG. 20 shows a backlit display having a brightness enhancement film according to the present invention.

FIG. 20 illustrates a display using a backlight that incorporates the brightness enhancement film of FIG. 19. In the display of FIG. 20, light source 162, reflector 164, light pipe 166, reflector 168, and diffuser 170 all perform similar functions to the equivalent items in the system of FIG. 8. Brightness enhancement films 172 and 174 also perform similar functions to the comparable items in the system of FIG. 8. Also like the system of FIG. 8, either of brightness enhancement films 172 and 174 could be a prior art brightness enhancement film or the brightness enhancement film of FIG. 7 as well as the brightness enhancement film of FIG. 19. Finally, LCD 176 is used to actually display data.

Figure 21:
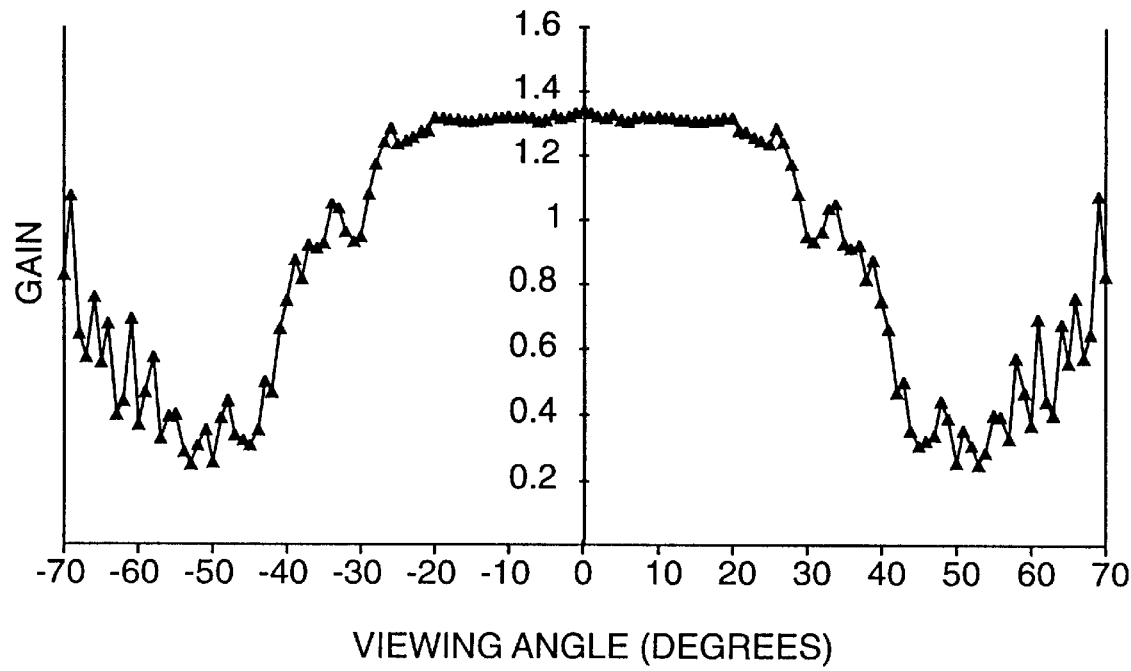
FIG. 21 is a computer generated graph of the estimated gain of the brightness enhancement film of FIG. 19.
Figure 22:
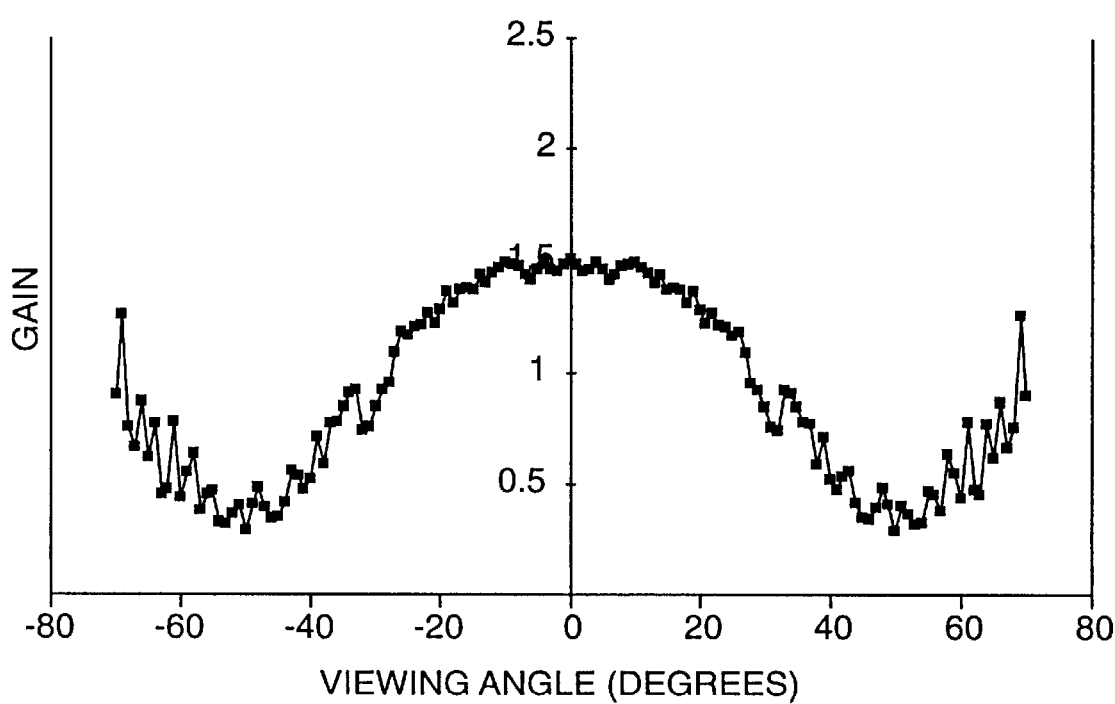
FIGS. 22 and 23 are graphs of the estimated gains of two sheets of the brightness enhancement film of FIG. 19.
Figure 23:
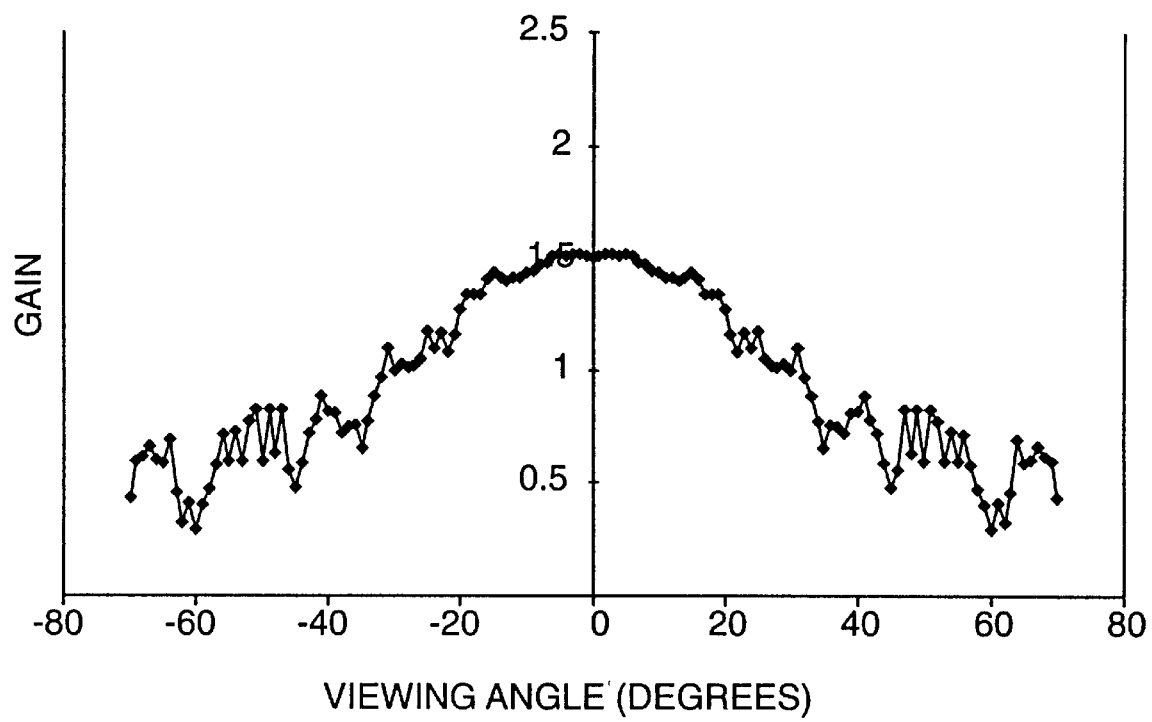

FIG. 21 is a computer generated model of the expected gain resulting from a single sheet of the brightness enhancement film of FIG. 19 as a function of the angle with the axis of the display measured across the grooves. As may be seen, this provides a gradual reduction in gain with increasing angle. FIGS. 22 and 23 are computer generated plots of the expected gain for a backlight having two sheets of the brightness enhancement film of FIG. 19 across and along the upper film's grooves, respectively.

Those skilled in the art will recognize that, in order to avoid problems created by optical coupling between adjacent brightness enhancement films, the height of the prisms could vary as taught in U.S. patent application Ser. No. 08/400,052, the disclosure of which is incorporated herein by reference.

What is claimed is:

1. A film for enhancing the apparent on axis brightness of a light source said film comprising first and second surfaces, said first surface being a structured surface having a plurality of linear prisms thereon, said prisms being disposed in side by side pairs, each pair having first and second prisms, and each prism having a prism angle and a valley angle wherein either said prism angles or said valley angles of each pair but not both are equal.

2. A film according to claim 1 wherein said prism angles are equal.

3. A film according to claim 1 wherein said valley angles are equal.

4. A backlight for use with a display said backlight comprising:

a light source;

a light pipe positioned to receive light from said light source; and a film for enhancing the apparent on axis brightness of said backlight, said film comprising first and second surfaces, said first surface being a structured surface having a plurality of linear prisms thereon, said prisms being disposed in side by side pairs, each pair having first and second prisms, and each prism having a prism angle and a valley angle wherein either said prism angles or said valley angles of each pair but not both are equal.

5. A backlight according to claim 4 wherein said prism angles are equal.

6. A backlight according to claim 4 wherein said valley angles are equal.

7. A backlight according to claim 4 further comprising a diffuser between said light pipe and said film.

8. A electronic display comprising:

a light source;

a light pipe positioned to receive light from said light source;

a film for enhancing the apparent on axis brightness of said backlight, said film comprising first and second surfaces, said first surface being a structured surface having a plurality of linear prisms thereon, said prisms being disposed in side by side pairs, each pair having first and second prisms, and each prism having a prism angle and a valley angle wherein either said prism angles or said valley angles of each pair but not both are equal; and an liquid crystal display module.

9. A display according to claim 8 wherein said prism angles are equal.

10. A backlight according to claim 8 wherein said valley angles are equal.

11. A backlight according to claim 8 further comprising a diffuser between said light pipe and said film.

* * * * *